May 1, 1951 W. G. LISLE ET AL 2,551,273
PRESSURE FLUID FOLLOW-UP SERVOMOTOR
Filed Dec. 20, 1946 3 Sheets-Sheet 1
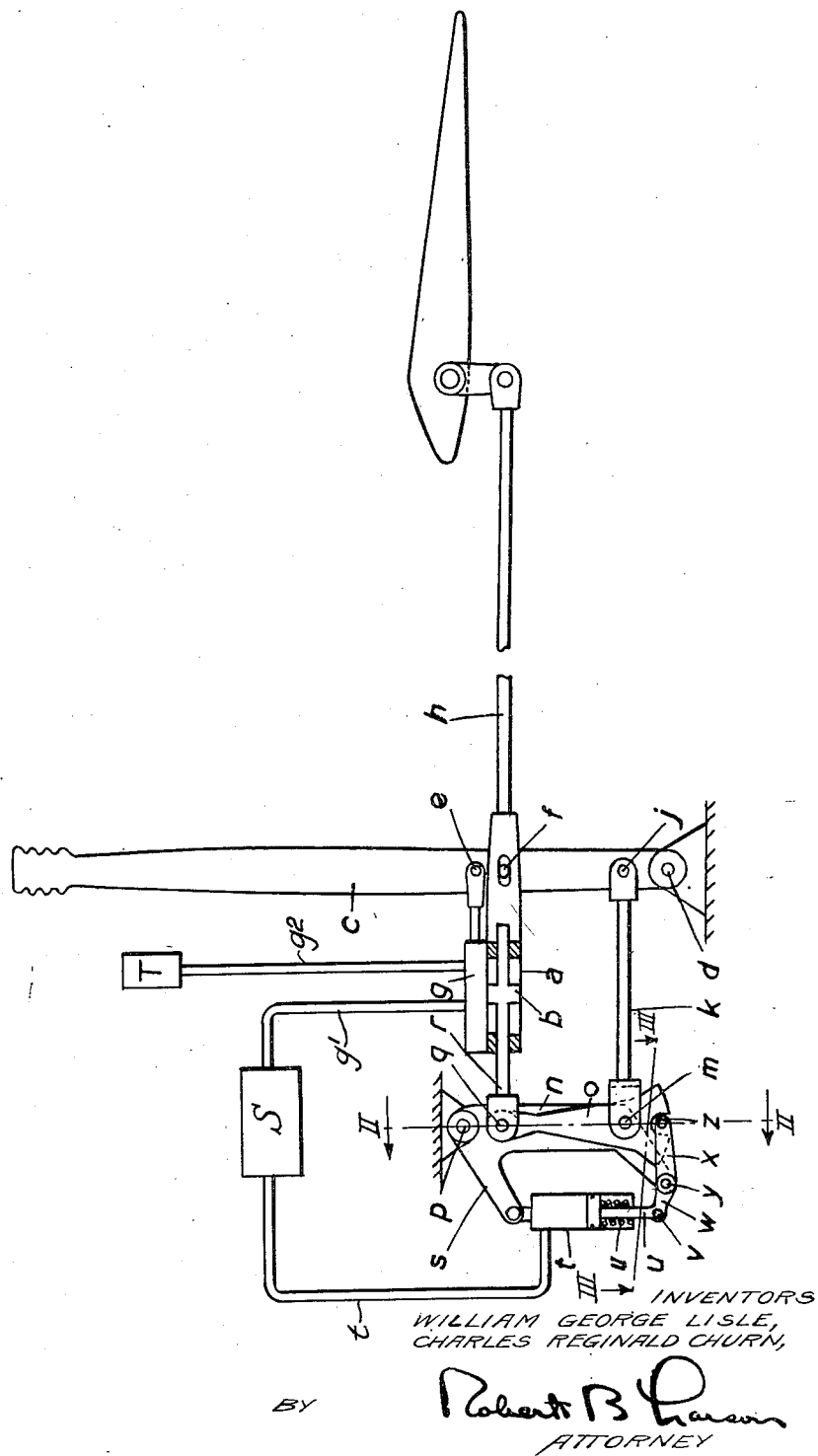
INVENTORS
WILLIAM GEORGE LISLE,
CHARLES REGINALD CHURN,
BY Robert B Larson
ATTORNEY

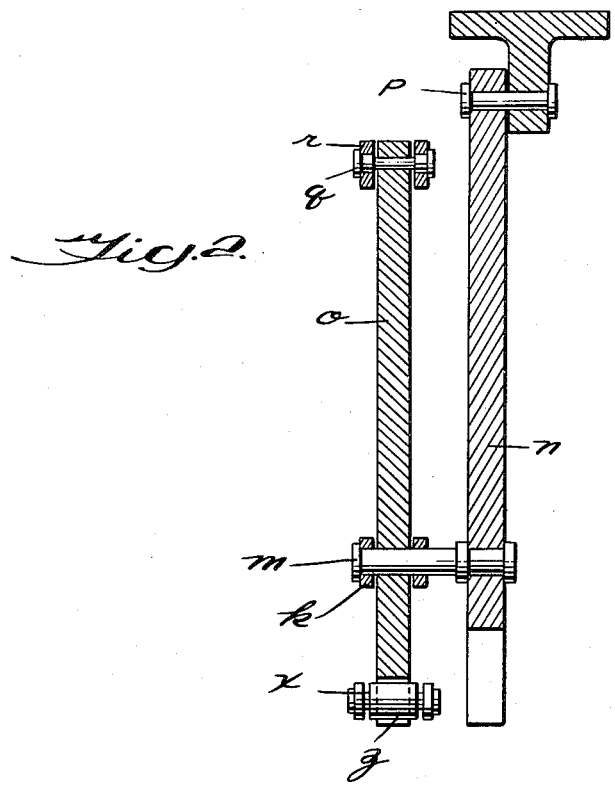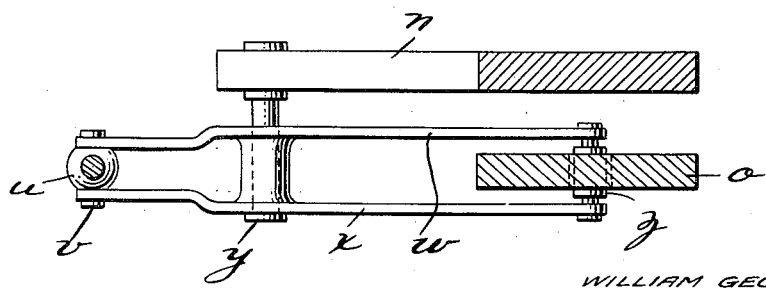

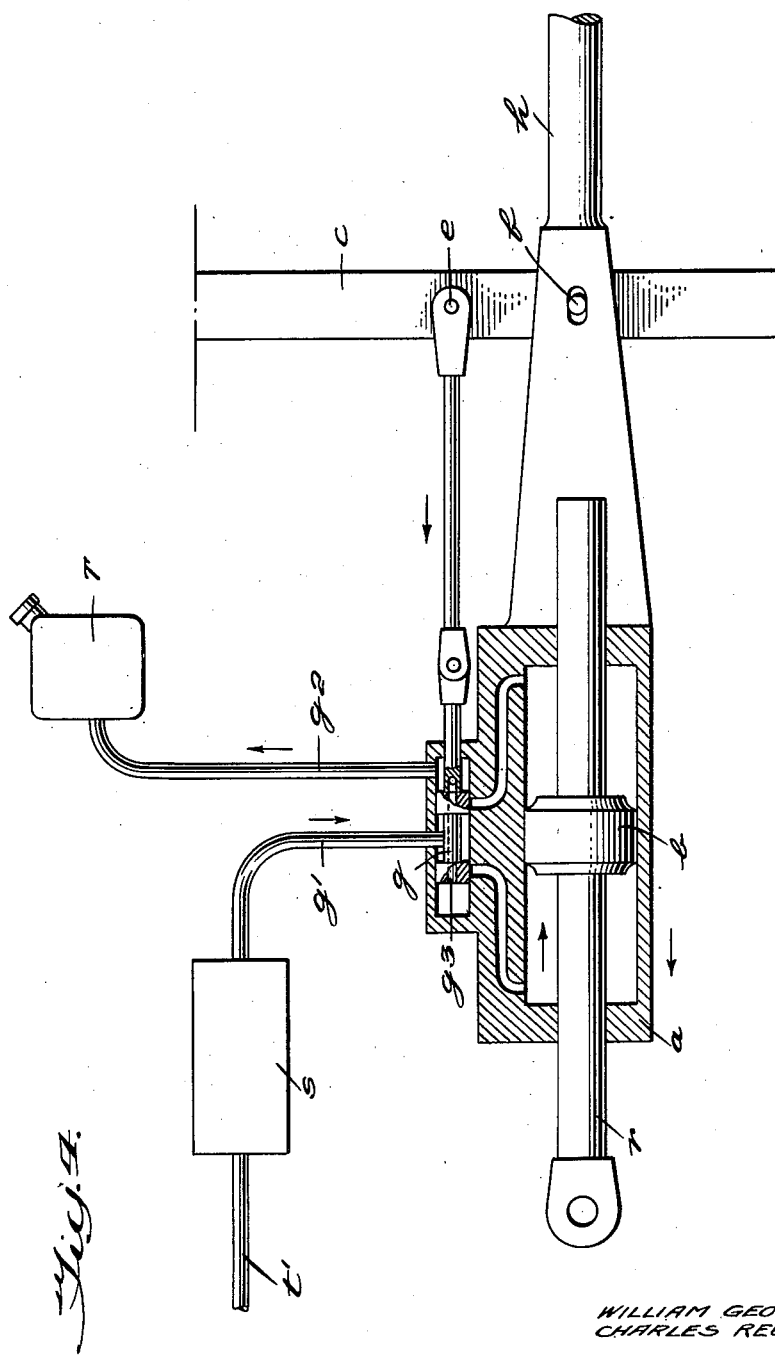

Patented May 1, 1951

2,551,273

UNITED STATES PATENT OFFICE 2,551,273

PRESSURE FLUID FOLLOW-UP SERVOMOTOR

William George Lisle, East Bedfont, and Charles Reginald Churn, Tilehurst, England, assignors to The Fairey Aviation Company Limited, Hayes, England Application December 20, 1946, Serial No. 717,344
In Great Britain January 14, 1946

3 Claims. (Cl. 121—41)

In United States Letters Patent No. 2,503,956, there are described and claimed means for actuating a control surface of an aircraft comprising a control column connected with the valve of a fluid pressure servomotor, both members of which (e. g. piston and cylinder) are movable, the control column being also connected, through lost motion means, with one of said members and with a surface to be controlled thereby and, through a movement reducing system of levers, of which the control column forms part, with the other of said members, so that, normally, movement of the control column acts on the fluid pressure valve to bring about actuation of the control surface and, to a very small extent, on the other movable member, whilst, in the event of failure of the fluid pressure system, the control column will act directly, after predetermined lost motion, on the control surface.

In such an arrangement the movement reducing system of levers (which may be adjustable to alter the effective leverage to suit requirements) may consist of the control column, which is arranged to function as a lever of the second order, and one or more levers of the second order, all said levers being interconnected so that the work output from the first lever acts as the power input to the second lever, and so on, the leverages being proportioned so that the movement necessary for the power input is great as compared with the movement of the work output.

The present invention constitutes an improvement on, or modification of, that described in the patent mentioned above and has for its object to improve that part of the mechanism which, in the event of failure of the fluid pressure system, enables the control column to act directly, after predetermined lost motion, on the control surface.

In accordance with the present invention that column of the second order with which the control lever is connected is formed in two parts, with one of which parts the control column is connected, said parts being adapted to be locked together so as to be movable as one when the fluid pressure system is normal, and being adapted automatically to be unlocked from one another in the event of failure of the fluid pressure system.

One of these parts may be pivoted on a fixed portion of the aircraft and the other may be arranged alongside and pivoted on, the first mentioned part, coaxially with a pivot at one end of a link by which the second mentioned part is connected with the control column, that end of the second mentioned part near the pivotal axis of the first mentioned part being connected with a member of the fluid pressure jack or the like.

The interlocking of the two parts of the two-part lever may be effected by the engagement in a notch in the one of a member carried by the other and arranged to be influenced, in the locking direction, by the pressure in the fluid pressure system, and, in the unlocking direction, by a return spring which can become effective only in the event of failure of the fluid pressure system. For example, there may be pivoted on the first mentioned part of the two-part lever a lever of the first order carrying at one end a roller to engage in a notch in one end of the second mentioned lever, the other end of the lever of the first order being acted on by one member of a secondary hydraulic servomotor, connected at one end with the first part of the two-part lever and also with the fluid pressure system and having at its other end a return spring.

One form of the invention is depicted in the accompanying drawings in which Figure 1 is a diagrammatic side elevation; Figure 2 is an enlarged fragmentary sectional elevation on the line II—II of Figure 1; Figure 3 is an enlarged fragmentary sectional plan on the line III—III of Figure 1; and Figure 4 is an enlarged sectional view of the main servomotor and its valve.

As illustrated in Figure 1 both the cylinder $a$ and the piston $b$ of a first hydraulic servomotor, by which a control surface $10$ of an aircraft is to be actuated, are movable. The control column $c$ of the aircraft is pivoted, at its lower end, to a fixed part of the aircraft as at $d$ and at points $e$ and $f$ intermediate of its length, it is connected, respectively, directly with the valve $g$ of the first hydraulic servomotor and, through a pin and slot connection, with a link $h$, one end of which is attached rigidly to the cylinder $a$ of the first hydraulic servomotor, and the other end of which is pivotally attached to an arm $i$ projecting radially from the pivotal axis of the control surface. At a point $j$ near its pivotal axis $d$ the control column $c$ is connected by a link or rod $k$ with a point $m$ near the lower end of a two-part lever $n, o$ disposed beyond that end of the first hydraulic servomotor remote from the control column $c$. One part $n$ of this two-part lever $n, o$ is pivoted at $p$ at its upper end to a fixed portion of the aircraft and the second part $o$ thereof is disposed alongside, and pivoted to, the first part $n$, its pivotal axis therewith being at the point $m$, i. e. coincident with the attachment, to the second part o, of the rod k by which the two-part lever n, o is connected with the control column c. At its upper end, which is near the pivotal axis p of the part n of the two-part lever n, o the second part o is pivotally connected at q with the piston rod r of the first hydraulic servomotor.

The part n of the two-part lever n, o has pivoted to a lug s near its upper end the cylinder t of a second hydraulic servomotor t, u the piston rod u of which is pivotally connected at v with one arm w of a lever w, x of the first order pivoted at y to a lug near the lower end of the part n, the other arm x of said lever carrying a roller z which is situated adjacent the lower end of the part o of the two-part lever n, o. The chamber of the valve g of the first servomotor and the upper end of the second servomotor t, u are permanently connected by pipes g' and t', respectively, with a fluid pressure system, indicated conventionally as a sources hence, normally, the servomotor t, u is fully extended and the roller z is forced into a notch in the lower end of the part o of the two-part lever n, o, thus locking the two parts n and o so that they are movable as one about the pivot p of the part n. Within the cylinder t of the second servomotor t, u is a return spring 11 which, in the event of failure of the fluid pressure system, is allowed to expand and thus contracts the overall length of said servomotor and withdraws the roller z from the notch in the end of the part o, thus unlocking the two parts n and o.

As a result of this arrangement of levers any given angular movement of the control column c will produce, mechanically, only a very slight linear movement, in the same sense, of the piston rod r of the first hydraulic servomotor a, b. Inasmuch, however, as the control column c is connected directly with the valve g of the first servomotor and indirectly through the pin and slot connection at f with the link h attached to the cylinder a of said servomotor and to the control surface, any movement of the control column c opens the valve g to admit fluid pressure to the cylinder a of the first servomotor before the pin and slot connection at f will permit the control column to act directly on the link h.

This admission of fluid pressure to the cylinder a of the first servomotor a, b causes said cylinder a to move relatively to the piston b, the piston constituting an abutment for the fluid pressure and being held in position by the effort exerted by the pilot on the control column c. Hence, the link h and the control surface are moved, and continue to move, until the cylinder a catches up with the valve g and cuts off the supply of fluid pressure.

While the control surface is being moved to the required extent the reaction which takes place, through the first hydraulic servomotor and the system of levers, on the control column c gives to the pilot the required sense of "feel" and this "feel" persists as long as the control surface is maintained in its set position, as the piston b of the first servomotor continues to serve as an abutment for the pressure in the operative end of the cylinder a of that servomotor. Thus the first hydraulic servomotor a, b, in effect, supplies the majority of the required effort, while the pilot supplies the remainder.

The valve chamber of the valve g of the first hydraulic servomotor is connected with the source of hydraulic pressure S by a flexible pipe g, and by a flexible pipe $g^2$ with a tank T in the usual manner, and, as mentioned above, the cylinder t of the second servomotor t, u is connected permanently by a pipe t' with said source S. This provides a safety precaution, to ensure control in the event of damage to the hydraulic system, for in such event, the return spring 11 of the second servomotor t, u acts to expel the fluid from its cylinder t, and withdraws the roller z from the notch in the end of the part o of the two-part lever n, o thus unlocking it from the part n and leaving it free to pivot thereon when the control column c is moved in either direction to actuate the control surface.

If desired, the part o of the two-part lever n, o may be allowed a predetermined amount of free movement, even when "locked" to the part n, by elongating the notch, thus, over a predetermined range of movement between the parts n and o, the fluid pressure system may be freed from the mechanical system, the fluid pressure system coming into operation only after said predetermined range of movement is exceeded.

It will be seen from Figure 4 that when the control column c is moved to the left the valve g is moved to the left and fluid under pressure is admitted to the left hand end of the cylinder a and tends to move the cylinder a to the left and the piston b to the right. As, however, the rod of the piston b is pivoted at g to the part o of the two part lever n, o and as the pivot g is close to the pivot p of the part n of said lever, the piston b remains substantially stationary and serves as an abutment. Hence the cylinder a is moved to the left, thus assisting the effort exerted by the pilot on the control column c. This movement continues until the control column c is held stationary by the pilot and the cylinder a catches up the valve g and cuts off the fluid under pressure. During this movement fluid in the right hand end of the cylinder a is expelled to the tank T by way of the pipe $g^2$. Similar action takes place if the control column c be moved to the right, the cylinder a being moved to the right and the fluid at its left hand end being expelled through an axial bore $g^3$ in the rod of the valve g and thence to the pipe $g^2$.

We claim:

1. In an aircraft control system operating in conjunction with a source of fluid under pressure, and in which a control column controls a control surface, the combination of a first fluid operated servomotor having a first piston element and a first cylinder element, a control linkage connecting one of said elements with the control surface, first valve means under the control of said control column and connected with said servomotor for directing fluid from said source of fluid under pressure to said servomotor in accordance with movements of said control column to bring about the desired movement of the control surface, a movement reducing lever arrangement connecting the control column with the other of said first elements to transmit movements of said control column to said other element in a direction opposite to the direction in which said other element is urged by the fluid directed to said servomotor, said movement reducing lever arrangement comprising a first lever and a second lever both movable to and fro in the same direction as the control column, a second servomotor having a second piston element and a second cylinder element, said second cylinder element being connected with the source of fluid under pressure, and a coupling device controlled by said second servomotor and arranged to couple said first and second levers when fluid pressure is admitted to said second cylinder element.

2. In an aircraft control system operating in conjunction with a source of fluid under pressure and in which a pivoted control column controls a control surface, the combination of a first fluid operated servomotor having a first piston element and a first cylinder element, a control linkage connecting one of said elements with the control surface, first valve means under the control of said control column and connected with said servomotor for directing fluid from said source of fluid under pressure to said servomotor in accordance with movements of said control column to bring about the desired movement of the control surface, a movement reducing lever arrangement connecting the control column with the other of said first elements to transmit movements of said control column to said other element in a direction opposite to the direction in which said other element is urged by the fluid directed to said servomotor, said movement reducing lever arrangement including a first lever and a second lever disposed side by side and both movable to and fro in the same direction as the control column, one end of said first lever being pivotally connected with said first piston element, and an intermediate point along the length of said first lever being linked to the control column at a point near the pivot of the latter, one end of said second lever being pivoted to a fixed part of the aircraft, a coupling device carried by the other end of said second lever and having a coupling position engaging said first lever to couple said first and second levers together, and an inoperative position in which said levers are movable relative to each other, a second servomotor having a second piston element and a second cylinder element, said second cylinder element being connected with the source of fluid under pressure, one of said two last mentioned elements being operably connected to said coupling device, the fluid pressure in said second cylinder element acting on said second piston element in one direction to urge said coupling device into coupling position, and a spring in said second cylinder element acting on said second piston element in the opposite direction, whereby when said coupling device is held in operation by the fluid pressure said first and second levers will move as one about the pivot of the second lever, but when the fluid pressure drops, said spring acts to unlock the coupling device and permit the first lever to move about its pivot on said first piston element.

3. In an aircraft control system operating in conjunction with a source of fluid under pressure, and in which a pivoted control column controls a control surface, the combination of a first fluid operated servomotor having a first piston element and a first cylinder element, a control linkage connecting one of said elements with the control surface, first valve means under the control of said control column and connected with said servomotor for directing fluid from said source of fluid under pressure to said servomotor in accordance with movements of said control column to bring about the desired movement of the control surface, a movement reducing lever arrangement connecting the control column with the other of said first elements to transmit movements of said control column to said other element in a direction opposite to the direction in which said other element is urged by the fluid directed to said servomotor, said movement reducing lever arrangement including a first lever and a second lever disposed side by side and both movable to and fro in the same direction as the control column, one end of said first lever being pivotally connected with said first piston element, an intermediate point along the length of said first lever being linked to the control column at a point near the pivot of the latter, and the other end of said first lever being formed with a notch, one end of said second lever being pivoted to a fixed part of the aircraft and formed with a first lug, a second lug at the other end of said second lever, a rocker arm pivoted intermediate its ends on said second lug, a lateral projection from one end of said rocker arm adapted to enter said notch, a second servomotor having a second piston element and a second cylinder element, said second cylinder element being connected with the source of fluid under pressure and being pivotally connected with said first lug, and said second piston element being pivotally connected with that end of the rocker arm remote from said lateral projection, the fluid pressure in said second cylinder element acting on said second piston element in one direction to bias the rocker arm in a direction to hold said lateral projection in engagement with said notch, and a spring in said second cylinder element acting on said second piston element in the opposite direction, the pressure of said spring being less than that of the fluid, whereby, when there is fluid pressure in said second cylinder element said lateral projection is held in the notch in said first lever and said first and second levers are constrained to move as one about the pivot of the second lever, but when the fluid pressure drops, said spring acts to move the rocking member about its pivot and to move its lateral projection out of the notch in said first lever, thus unlocking said first and second levers and permitting said first lever to move about its pivot on said first piston element.

WILLIAM GEORGE LISLE.
CHARLES REGINALD CHURN.

REFERENCES CITED

The following references are of record in the file of this patent:

UNITED STATES PATENTS

| Number | Name | Date |
| --- | --- | --- |
| 2,366,382 | Burton | Jan. 2, 1945 |
| 2,385,351 | Davidson | Sept. 25, 1945 |